United States Patent
Binek et al.

(10) Patent No.: US 11,738,519 B2
(45) Date of Patent: Aug. 29, 2023

(54) SYSTEMS AND METHODS FOR SUPPORT MATERIAL REMOVAL

(71) Applicant: UNITED TECHNOLOGIES CORPORATION, Farmington, CT (US)

(72) Inventors: Lawrence A Binek, Glastonbury, CT (US); David W Morganson, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 432 days.

(21) Appl. No.: 16/402,977

(22) Filed: May 3, 2019

(65) Prior Publication Data
US 2020/0346413 A1 Nov. 5, 2020

(51) Int. Cl.
| | |
|---|---|
| *B29C 64/40* | (2017.01) |
| *B29C 64/393* | (2017.01) |
| *B33Y 40/20* | (2020.01) |
| *B22F 10/28* | (2021.01) |
| *B33Y 10/00* | (2015.01) |
| *B33Y 40/00* | (2020.01) |
| *B33Y 50/02* | (2015.01) |
| *B22F 10/43* | (2021.01) |
| *B22F 10/80* | (2021.01) |
| *B22F 10/66* | (2021.01) |

(Continued)

(52) U.S. Cl.
CPC ............. *B29C 64/40* (2017.08); *B22F 10/43* (2021.01); *B22F 10/66* (2021.01); *B22F 10/80* (2021.01); *B29C 64/393* (2017.08); *B33Y 10/00* (2014.12); *B33Y 40/00* (2014.12); *B33Y 40/20* (2020.01); *B33Y 50/02* (2014.12); *B22F 10/12* (2021.01); *B22F 10/14* (2021.01); *B22F 10/25* (2021.01); *B22F 10/28* (2021.01)

(58) Field of Classification Search
CPC ....... B29C 64/40; B29C 64/393; B33Y 10/00; B33Y 40/00; B33Y 50/02
USPC ....................................................... 264/308
See application file for complete search history.

(56) References Cited

U.S. PATENT DOCUMENTS

| | | |
|---|---|---|
| 9,833,839 B2 | 12/2017 | Gibson et al. |
| 10,137,632 B2 | 11/2018 | Mantell et al. |

(Continued)

FOREIGN PATENT DOCUMENTS

| | | |
|---|---|---|
| WO | 2018141476 | 8/2018 |
| WO | 2018200515 | 11/2018 |

(Continued)

OTHER PUBLICATIONS

European Patent Office, European Search Report dated Sep. 17, 2020 in Application No. 20172536.3.

*Primary Examiner* — Hana C Page
(74) *Attorney, Agent, or Firm* — Snell & Wilmer L.L.P.

(57) ABSTRACT

A method of manufacturing an additively manufactured component may comprise operating an additive manufacturing machine to form a first structure including an elongate portion having a blind design surface, operating the additive manufacturing machine to form a removal tool proximate the blind design surface, wherein the blind design surface and the removal tool are at least partially enclosed by and in contact with a support material, and translating the removal tool along the blind design surface to separate a portion of the support material from the blind design surface.

8 Claims, 5 Drawing Sheets

(51) Int. Cl.
*B22F 10/12* (2021.01)
*B22F 10/14* (2021.01)
*B22F 10/25* (2021.01)

(56) References Cited

U.S. PATENT DOCUMENTS

| | | | |
|---|---|---|---|
| 2016/0107393 A1* | 4/2016 | Hartmann | B22F 10/40 700/98 |
| 2018/0029123 A1* | 2/2018 | Gubelmann | B29C 64/40 |
| 2018/0071824 A1* | 3/2018 | Gubelmann | B22F 3/24 |
| 2019/0079491 A1 | 3/2019 | Barua et al. | |

FOREIGN PATENT DOCUMENTS

| | | | |
|---|---|---|---|
| WO | WO-2018200515 A1 * | 11/2018 | F27B 5/04 |
| WO | 2019021389 | 1/2019 | |

* cited by examiner

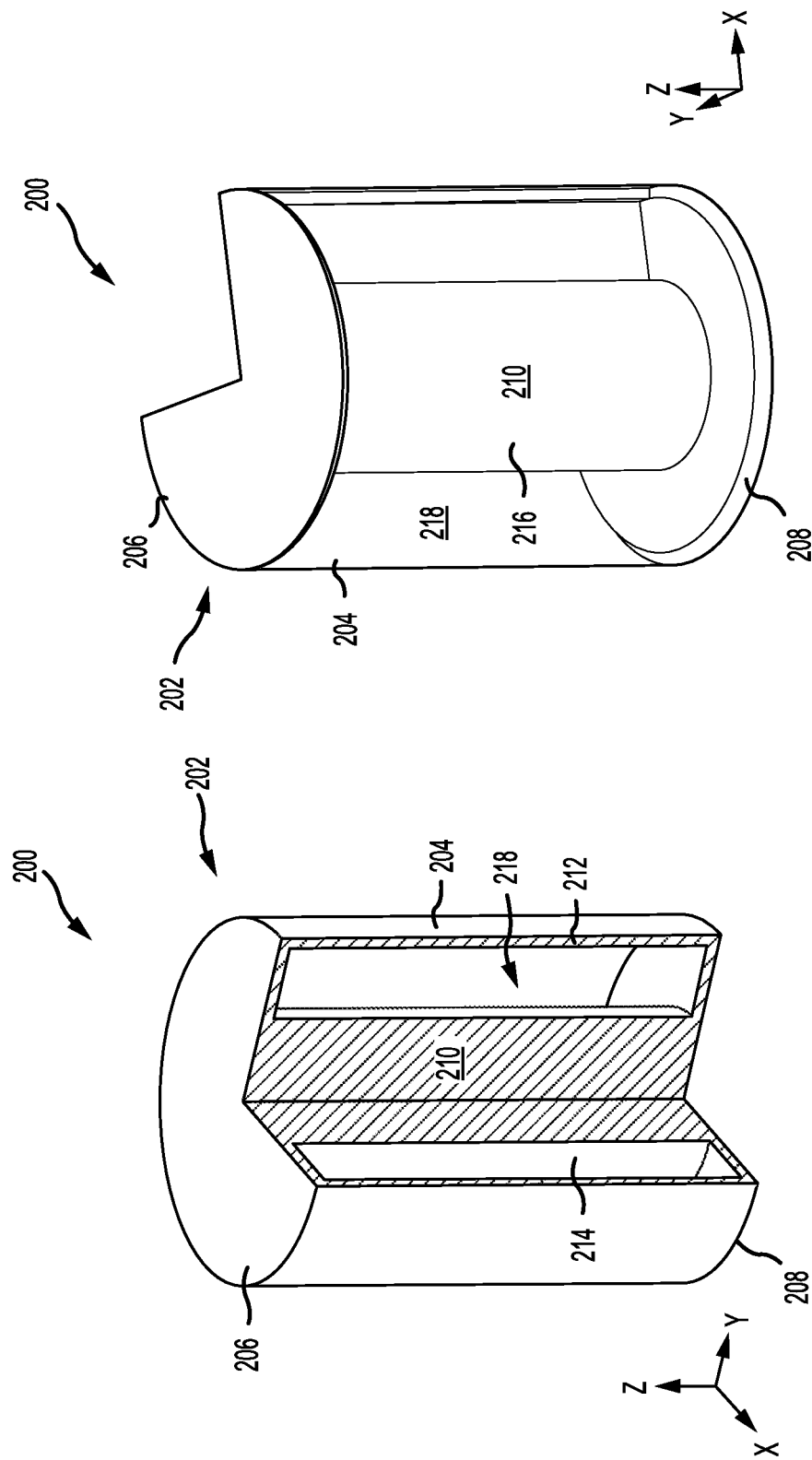

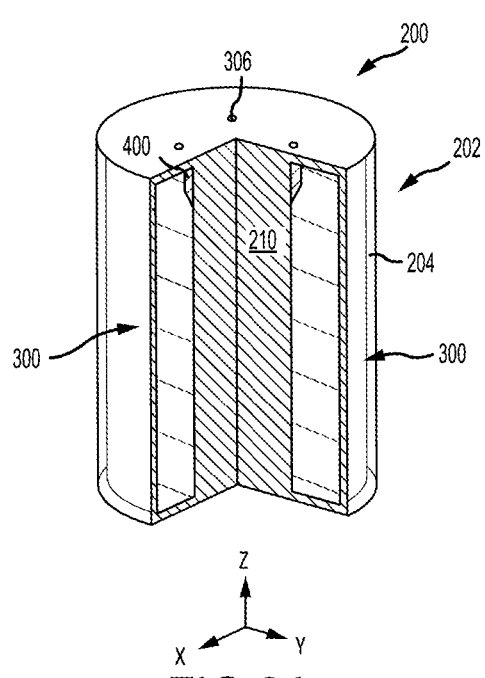
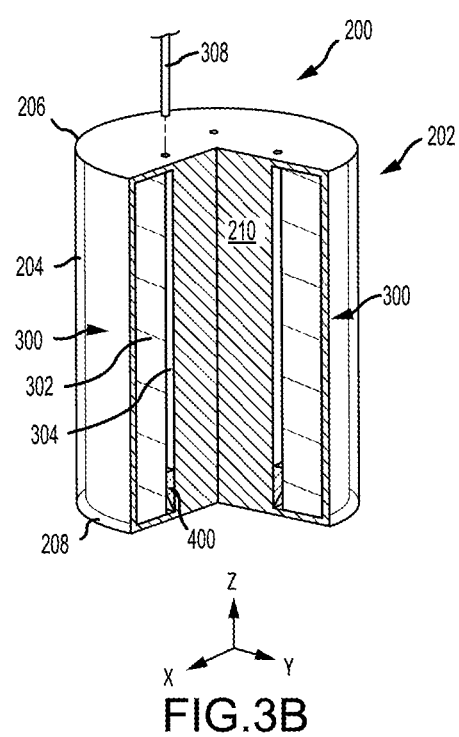
FIG.3A
FIG.3B

SYSTEMS AND METHODS FOR SUPPORT MATERIAL REMOVAL

FIELD

The present disclosure relates to additive manufacturing and, more specifically, to systems and methods for removal of additive manufacture support structures and materials.

BACKGROUND

Components and structured fabricated by additive manufacturing methods may tend to include supporting structures or materials which may benefit additive manufacturing operations. Supporting structures may be removed during finishing operations subsequent to additive manufacturing operations. Removal of support structures and materials may be a relatively time consuming and/or difficult process for certain structural geometries.

SUMMARY

In various embodiments, a method of manufacturing an additively manufactured component comprises operating an additive manufacturing machine to form a first structure including an elongate portion having a blind design surface, operating the additive manufacturing machine to form a removal tool proximate the blind design surface, wherein the blind design surface and the removal tool are at least partially enclosed by and in contact with a support material, and translating the removal tool along the blind design surface to separate a portion of the support material from the blind design surface.

In various embodiments, the support material comprises a partially cured resin. In various embodiments, the removal tool comprises a contact surface proximate the blind design surface and defined thereby. In various embodiments, the removal tool comprises a paring surface which intersects the contact surface at a leading edge to define a paring angle. In various embodiments, the paring angle is between 5° and 30°. In various embodiments, the removal tool includes tabs configured to enable manual manipulation of the removal tool. In various embodiments, the first structure includes a port configured to enable the removal tool to interface with a driving tool. In various embodiments, the removal tool is at least partially enclosed by the first structure. In various embodiments, the method includes removing the removal tool from the first structure. In various embodiments, the removal tool includes a weakened portion configured to facilitate separation of the removal tool from the blind design surface.

In various embodiments a system for generating a support material removal tool comprises a processor and a tangible, non-transitory memory configured to communicate with the processor, the tangible, non-transitory memory having instructions stored thereon that, in response to execution by the processor, cause the processor to perform operations comprising receiving an initial design file defining a first structure, identifying at least one blind design surface of the first structure, generating a second structure corresponding the blind design surface, wherein the second structure includes a contact surface proximate the blind design surface and paring surface intersecting the contact surface at a leading edge of the second structure, and modifying the initial design file to generate a production design file including the second structure In various embodiments, the system may determine an offset distance between the blind design surface of the first structure and the contact surface of the second structure. In various embodiments, the system may determine a paring angle between the contact surface and the paring surface based on a material property of a support material. In various embodiments, the system may instruct an additive manufacturing machine to fabricate an additively manufactured component, based on the production design file, comprising the first structure and the second structure including a support material at least partially surrounding the second structure. In various embodiments, the first structure and the second structure comprise a cured resin and the support material comprises a partially cured resin. In various embodiments, the second structure includes a weakened portion configured to facilitate separation of the second structure from the first structure.

In various embodiments an article of manufacture is provided. The article of manufacture includes a non-transitory, tangible computer readable storage medium having instructions stored thereon that, in response to execution by a computer based system, cause the computer based system to perform operations comprising receiving an initial design file defining a first structure, identifying at least one blind design surface of the first structure, generating a second structure corresponding the blind design surface, wherein the second structure includes a contact surface proximate the blind design surface and paring surface intersecting the contact surface at a leading edge of the second structure, and modifying the initial design file to generate a production design file including the second structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2A illustrates an additively manufactured component, in accordance with various embodiments;

FIG. 2B illustrates an additively manufactured component, in accordance with various embodiments;

FIG. 3A illustrates an additively manufactured component, in accordance with various embodiments;

FIG. 3B illustrates an additively manufactured component, in accordance with various embodiments;

DETAILED DESCRIPTION

Figure 1:
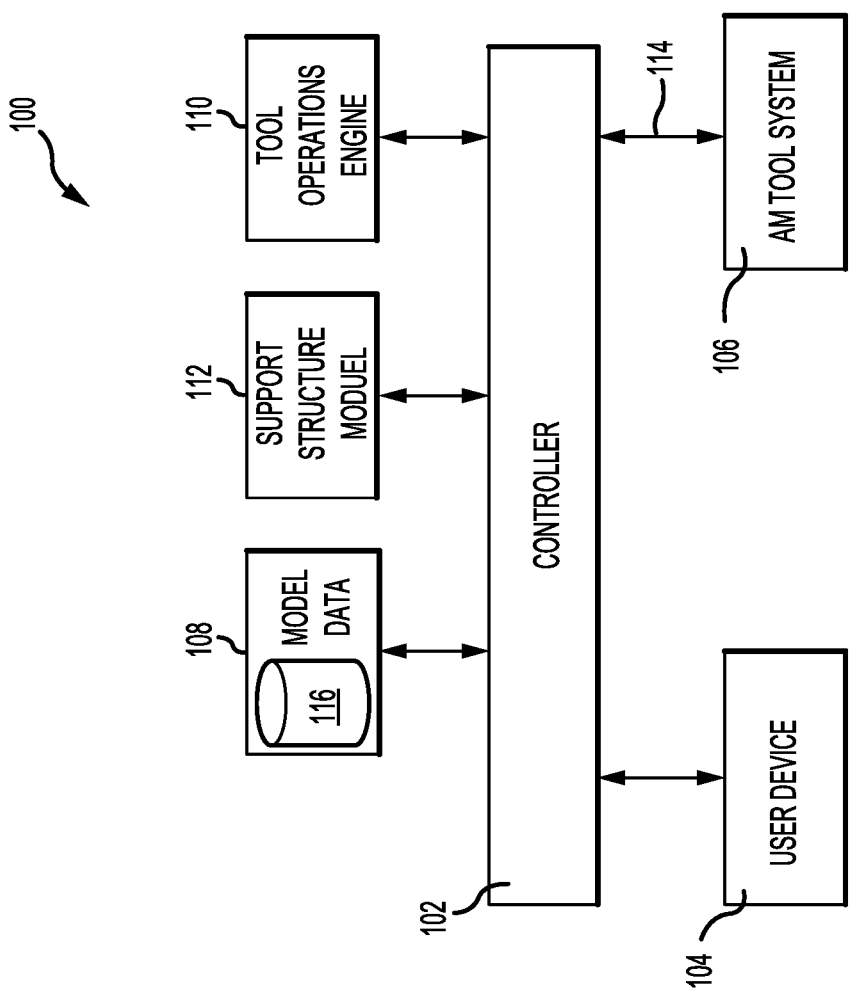
FIG. 1 illustrates a system for generating a support material removal tool, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Digital three-dimensional object manufacturing, also known as digital additive manufacturing, is a process of making a three-dimensional solid object of virtually any shape from a digital model. Three-dimensional object printing (3D printing) is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. 3D printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. In many three-dimensional object printers, support material is used to enable layers of material to be formed where no surface or previously formed portions of a part exist. Particularly, such printers form support portions using a support material, such as wax, partially cured resins, and/or the like, and form portions of an object on top or adjacent to the support portions or may partially enclose the support portions. After the object is formed, the support material is removed from the object. The support material is typically removed by soaking the object in water, jetting water onto the object, soaking the object in other chemicals, heating the object, or other such process which may be manual. Such removal processes may tend to be time consuming and have limitations exacerbated by larger printed objects and/or those having complex geometries. For example, a substantial amount of support material may be enclosed or obscured by the finished part structure or geometry tending thereby to inhibit efficient removal of the support structure from the finished part.

With reference to FIG. 1, a block diagram of a system 100 for generating a support material removal tool is illustrated according to various embodiments. System 100 may comprise a controller 102, an user device 104, an Additive Manufacturing (AM) tool 106, and a database 108. System 100 may further comprise a tool operations engine 110 and a support structure module 112.

In various embodiments, controller 102 may be configured as a central network element or hub to access various systems, engines, and components of system 100. Controller 102 may comprise a network, computer-based system, and/or software components configured to provide an access point to various systems, engines, and components of system 100. Controller 102 may be in operative and/or electronic communication with user device 104, AM tool 106, database 108, tool operations engine 110 and/or support structure module 112. Controller 102 may comprise any suitable combination of hardware, software, and/or database components. For example, controller 102 may comprise one or more network environments, servers, computer-based systems, processors, databases, and/or the like. Controller 110 may comprise at least one computing device in the form of a computer or processor, or a set of computers/processors, although other types of computing units or systems may be used, such as, for example, a server, web server, pooled servers, or the like. Controller 102 may also include one or more data centers, cloud storages, or the like, and may include software, such as APIs, SDKs, etc. configured to retrieve and write data to the user device 104, AM tool 106, database 108, tool operations engine 110 and/or support structure module 112. In various embodiments, controller 102 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, user device 104 may enable a user to interact with system 100 to upload model files, edit model files, control the AM tool 106, generate and/or print structures and the like. User device 104 may comprise any suitable combination of hardware, software, and/or database components. For example, user device 104 may comprise at least one computing device in the form of a computer or processor, or a set of computers/processors, although other types of computing units or systems may be used. The processor may be configured to implement various logical operations in response to execution of instructions, for example, instructions stored on a non-transitory, tangible, computer-readable medium, as discussed further herein. For example, user device 104 may comprise a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. User device 104 may comprise an operating system, such as, for example, a WINDOWS® mobile operating system, an ANDROID' operating system, APPLE® IOS®, a BLACKBERRY® operating system, and the like.

In various embodiments, AM tool system 106 may comprise hardware and/or software configured to perform additive manufacturing operations to generate an datively manufactured component, a structure, a workpiece, and/or the like in response to instructions from a controller. AM tool system 106 may be configured to communicate with controller 102 and receive tool instructions 114 from controller 102. In various embodiments, AM tool system 106 may comprise a photopolymerization machine, a powder bed fusion machine, a 3D printing machine, a material jetting machine, a binder jetting machine, a material extrusion machine, a sheet lamination machine, a directed energy deposition machine, and/or the like.

In various embodiments, database 108 may comprise any number of data elements or data structures such as, for example, model data 116. Database 108 may be configured to store data using any suitable technique described herein or known in the art. Database 108 may be configured to store digital models and data related to digital models of a structure or work piece as model data 116. The model data 116 may include design files (e.g., initial design files, final design files, production design files, etc.) defining one or more structures.

In various embodiments, the tool operations engine 110 may be configured to generate the tool instructions 114 from controller 102 based on the model data 116. In various embodiments, a tool instruction may comprise data such as instructions for AM tool paths, G-codes, M-codes, layered additive programs, and/or the like.

In various embodiments and with reference now to FIGS. 2A and 2B an additively manufactured component 200 is shown in the finished condition with XYZ-axes provided for orientation. Component 200 includes a first structure 202 comprising relatively cylindrical housing 204 extending (along the Z-axis) between a first end face 206 and a second end face 208. Housing 204 partially encloses an elongate portion 210 thereby defining a cavity 218 within the housing 204 having a first opening 212 and a second opening 214. With particular reference to FIG. 2B, housing 204 is rendered partially transparent to illustrate a blind design surface 216 of the elongate portion 210 which may be otherwise obscured by the housing 204. In various embodiments, the cavity 218 may be defined between the housing 204 and the blind design surface 216. In this regard, access to the blind design surface 216 may be relatively restricted by the geometry of the openings (212, 214) and the housing 204.

In various embodiments, and with additional reference to FIGS. 3A and 3B additively manufactured component 200 is shown in the as-printed condition with XYZ-axes provided for orientation. Housing 204 is rendered as relatively transparent to illustrate support material 300 which fills the cavity 218. The support material 300 may be added during the additive manufacturing operations to support the structure 202 during fabrication. The support material 300 may contact and enclose the blind design surface 216 tending thereby to inhibit removal of the support material 300. In various embodiments, the additively manufactured component 200 includes a removal tool 400 (i.e., a second structure) which may be fabricated in conjunction with the first structure 202.

The removal tool 400 may be partially enclosed by and in contact with the support material 300. The removal tool 400 may be coupled to the elongate portion 210 proximate the blind design surface 216 and configured to translate along the elongate portion 210. As shown in FIG. 3B, the removal tool 400 is translated along the blind design surface 216 between the first end face 206 and the second end face 208. In response to the translation of the removal tool 400, a portion 302 of the support material 300 is separated from the blind design surface 216 opening a gap 304 therebetween. In this regard, the removal tool 400 may tend to facilitate removal of the support material 300. In various embodiments the first structure 202 may comprise one or more ports 306 configured to enable the removal tool 400 to interface with a driving tool 308 such as, for example, a pin or punch inserted through the port 306 to contact the removal tool 400. In this regard, a motive force may be applied to the removal tool 400 via the driving tool tending thereby to translate the removal tool 400 along the elongate portion 210 and the blind design surface 216.

Figure 4A:
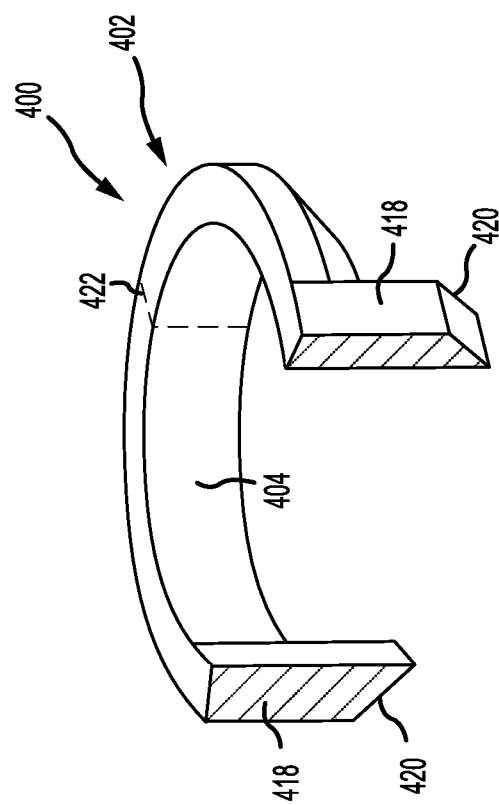
FIG. 4A illustrates a removal tool, in accordance with various embodiments.
Figure 4B:
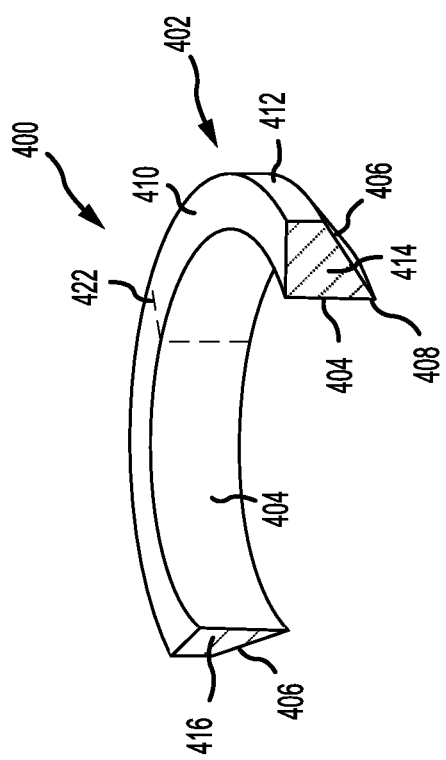
FIG. 4B illustrates a removal tool, in accordance with various embodiments.
Figure 5:
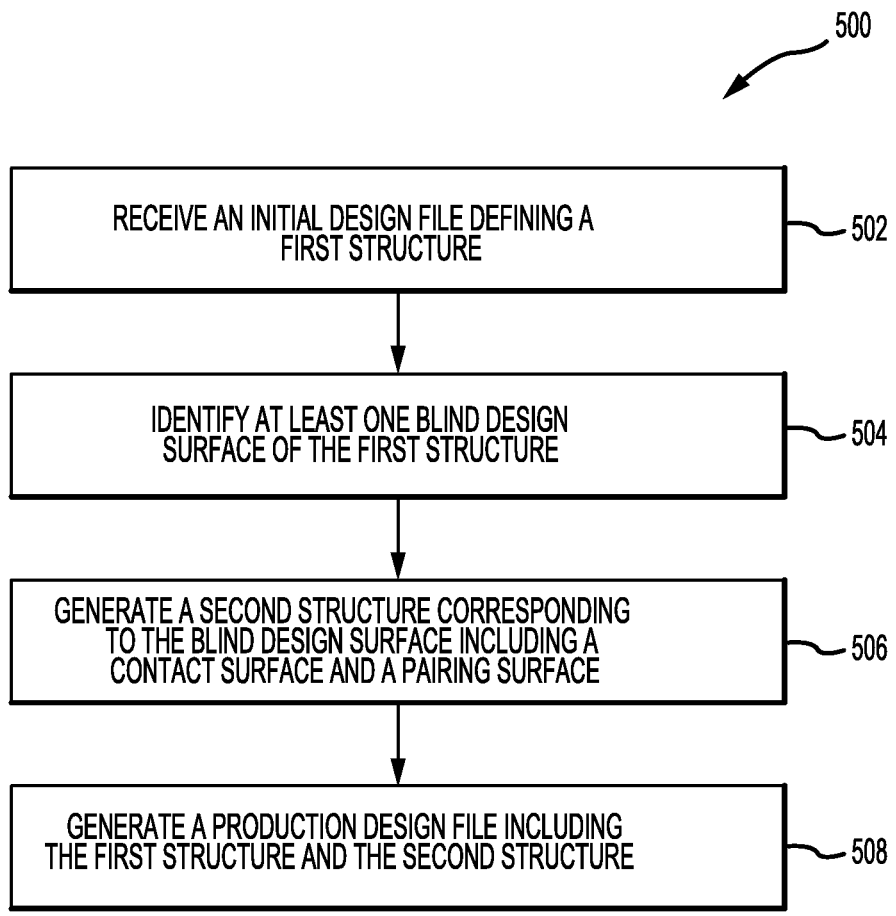
FIG. 5 illustrates a process flow in a system for generating a support material removal tool, in accordance with various embodiments.

With additional reference to FIGS. 4A and 4B removal tool 400 is illustrated in accordance with various embodiments. Removal tool 400 comprises a body 402 including a contact surface 404 and a paring surface 406. The contact surface 404 is defined by the geometry of the blind design surface 216 of the elongate portion 210. The paring surface 406 intersects the contact surface 404 at a leading edge 408 to define a paring angle. In various embodiments the paring angle may be between 5° and 30°. Body 402 may be further defined by a drive surface 410 opposite the leading edge 408 and configured to interface with the driving tool 308. The drive surface 410 may extend between the contact surface 404 and a separation surface 412. In like regard, the paring surface 406 may extend between the contact surface 404 and the separation surface 412. The body 402 may extend between a first face 414 and a second face 416. In various embodiments as illustrated in FIG. 4B, the removal tool 400 may include one or more tabs 418 configured to enable manual manipulation of the removal tool 400. Tabs 418 may be coupled to the first face 414 and/or the second face 416 of the body 402. In various embodiments, the tabs 418 may comprise a paring surface 420. In various embodiments, the removal tool 400 may comprise a weakened portion 422 configured to facilitate separation of the removal tool from the blind design surface. For example, weakened portion 422 may me relatively weak in tension or shear bending tending to cause separation of the body 402 into halves in response thereby enabling decoupling of the removal tool from the elongate portion 210 and blind design surface 216.

In various embodiments a process 500 in a system 100 for generating a support material removal tool may comprise controller 102 receiving an initial design file from database 108 (step 502). The design file may comprise model data 116 defining a first structure such as first structure 202. The system 100 may identify at least one blind design surface 216 of the first structure 202 (step 504). Step 504 may include viewing the model data 116 via the user device 104 selecting the blind design surface. In various embodiments, step 504 includes the support structure module 112 parsing the model data 116 to identify a blind design surface. In various embodiments, the support structure module 112 may generate a removal tool in response to identifying the blind design surface (step 506). For example, system 100 may generate removal tool body 402 corresponding the blind design surface 216 including contact surface 404 proximate the blind design surface 216.

In various embodiments, step 506 includes determining an offset distance between the blind design surface 216 the contact surface 404. In this regard, the removal tool body 402 is separated from the elongate portion 210 and free to slidably engage therewith. In various embodiments, controller 102 may receive the offset distance from the user device 104 or may generate the offset distance via the support structure module 112. Step 506 includes selecting a paring angle between the contact surface 404 and the paring surface 406 based on a material property of the support material 300. For example, the paring angle may a function of support material viscosity and/or density and, in this regard, the paring angle may decrease with respect to an increase in support material viscosity. In various embodiments, controller 102 may receive the paring angle from the user device 104 or may generate the paring angle via the support structure module 112.

Process 500 includes controller 102 updating the model data 116 of database 108 to define the removal tool 400. In this regard, system 100 may modify the initial design file to generate a production design file including the first structure and the second structure (step 508). Step 508 may include tool operations engine 110 generating tool instructions 114 based on the production design file. Step 508 may include instructing by controller 102 an additive manufacturing machine of AM tool system 106 to fabricate additively manufactured component 200 comprising the first structure 202 and the removal tool 400 including the support material 300 at least partially surrounding the removal tool 400.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
a driving tool;
an additive manufacturing machine;
a processor in electronic communication with the driving tool and the additive manufacturing machine; and
a tangible, non-transitory memory configured to communicate with the processor,
the tangible, non-transitory memory having instructions stored thereon that, in response to execution by the processor, cause the processor to perform operations comprising:
receiving an initial design file defining a first structure;
identifying a blind design surface of the first structure;
generating a support material removal tool, the support material removal tool comprising a second structure corresponding to the blind design surface, wherein the second structure includes a contact surface proximate the blind design surface and paring surface intersecting the contact surface at a leading edge of the second structure;
generating a production design file including the first structure and the support material removal tool;
commanding, by the processor, the additive manufacturing machine to fabricate an additively manufactured component, based on the production design file, comprising the first structure, the support material removal tool, and a support material at least partially surrounding the support material removal tool;
commanding, by the processor, the driving tool to provide a motive force to the support material removal tool; and
in response to commanding the driving tool, translating the support material removal tool along the blind design surface from a first end to a second end of the additively manufactured component to create the additively manufacutred component with a cavity defined between the blind design surface and a housing, the support material removal tool configured to remain within the cavity.

2. The system of claim 1, wherein the operations further comprise:
determining, by the processor, an offset distance between the blind design surface of the first structure and the contact surface of the second structure.

3. The system of claim 1, wherein the operations further comprise:
selecting, by the processor, a paring angle between the contact surface and the paring surface based on a material property of the support material.

4. The system of claim 1, wherein the first structure and the second structure comprise a cured resin and the support material comprises a partially cured resin.

5. The system of claim 1, wherein the second structure includes a weakened portion configured to facilitate separation of the second structure from the first structure.

6. An article of manufacture including a non-transitory, tangible computer readable storage medium having instructions stored thereon that, in response to execution by a computer based system, cause the computer based system to perform operations comprising:

receiving an initial design file defining a first structure;

identifying a blind design surface of the first structure;

generating a support material removal tool, the support material removal tool comprising a second structure corresponding to the blind design surface, wherein the second structure includes a contact surface proximate the blind design surface and paring surface intersecting the contact surface at a leading edge of the second structures;

generating a production design file including the first structure and the support material removal tool;

commanding an additive manufacturing machine to fabricate an additively manufactured component, based on the production design file, comprising the first structure, the support material removal tool, and a support material at least partially surrounding the support material removal tool, wherein in response to the commanding the additive manufacturing machine, the additively manufactured component is fabricated by the additive manufacturing machine;

commanding a driving tool to provide a motive force to the support material removal tool, the driving tool comprising a pin that is inserted through a port at a first end of the additively manufactured component in response to the commanding the driving tool to provide the motive force to the support material; and in response to instructing the driving tool, translating the support material removal tool along the blind design surface to create the additively manufactured component with a cavity defined between the blind design surface and a housing.

7. The article of manufacture of claim 6, wherein the operations further comprise:

determining an offset distance between the blind design surface of the first structure and the contact surface of the second structure.

8. The article of manufacture of claim 6, wherein the operations further comprise:

selecting a paring angle between the contact surface and the paring surface based on a material property of the support material.

* * * * *

UNITED STATES PATENT AND TRADEMARK OFFICE
CERTIFICATE OF CORRECTION

PATENT NO. : 11,738,519 B2
APPLICATION NO. : 16/402977
DATED : August 29, 2023
INVENTOR(S) : Lawrence A Binek et al.

It is certified that error appears in the above-identified patent and that said Letters Patent is hereby corrected as shown below:

In the Claims

Claim 6, Column 10, Line 11 Please delete "instructing" and insert --commanding--

Signed and Sealed this
Twenty-fourth Day of October, 2023

Katherine Kelly Vidal
*Director of the United States Patent and Trademark Office*